United States Patent [19]

Benz

[11] Patent Number: 4,896,536

[45] Date of Patent: Jan. 30, 1990

[54] OSCILLATION UNIT FOR FILLING LEVEL VIBRATION LIMIT SWITCH

[75] Inventor: Karl Benz, Schiltach, Fed. Rep. of Germany

[73] Assignee: Vega Grieshaber GmbH & Co., Wolfach, Fed. Rep. of Germany

[21] Appl. No.: 264,020

[22] Filed: Oct. 28, 1988

[30] Foreign Application Priority Data

Nov. 30, 1987 [DE] Fed. Rep. of Germany ....... 3740598

[51] Int. Cl.$^4$ ............................................. G01F 23/28
[52] U.S. Cl. .................... 73/290 V; 310/321; 340/621
[58] Field of Search ................... 73/290 R, 290 V; 310/323; 340/618, 621

[56] References Cited

U.S. PATENT DOCUMENTS

| | | | |
|---|---|---|---|
| 3,100,390 | 8/1963 | Banks | 73/290 V X |
| 4,325,416 | 4/1982 | Hermann | 73/290 V X |
| 4,540,981 | 9/1985 | Lepetina et al. | 310/321 X |
| 4,740,726 | 4/1988 | Umezawa | 73/290 V X |
| 4,785,663 | 11/1988 | Hermann | 73/290 V |

FOREIGN PATENT DOCUMENTS 0089336 3/1986 European Pat. Off. .

Primary Examiner—Daniel M. Yasich
Attorney, Agent, or Firm—Dennison, Meserole, Pollack & Scheiner

[57] ABSTRACT

A device for determining the filling level in a container including an oscillator with two rotational oscillation elements (10, 12) of the same resonance frequency which oscillate oppositely. The oscillation elements (10, 12) are arranged coaxially, have a common rotational axis, masses of the same size, and a common mass center. Both oscillation elements (10, 12) are fixed to a common membrane which serves as a retraction spring, through which a common drive of both oscillation elements (10, 12) is possible.

7 Claims, 2 Drawing Sheets

OSCILLATION UNIT FOR FILLING LEVEL VIBRATION LIMIT SWITCH

BACKGROUND OF THE INVENTION

The invention is based on a device for determining a certain filling level in a container with an oscillation probe which has two oscillation elements which have the same resonance frequency and vibrate in two opposite directions of rotation. The elements are arranged spaced coaxially to one another, with the outer vibration element at least partially enclosing the inner oscillation element whereby the vibrations of the oscillation probe are damped when touching the filling material with the outer oscillation element. The drive of the oscillation probe and the detection of the oscillation amplitude occur by means of an electromechanical transformer in the form of piezo-electrical elements, as they, for example, are known from EP 0 089 336. Through this, a precise monitoring of the level of the filling material in the container is made possible, independent of the clamping conditions of the oscillation probe and for nearly every kind of filling material of great and little density.

The coaxially formed rotary oscillation systems had the disadvantage that the elastic or resilient mounting of both oscillation elements was provided separately by each of the two independent spring elements. Thus, the mutual driving of both oscillation elements was not possible.

SUMMARY OF THE INVENTION

The invention therefore has the object of further developing a device of the initially named kind such that both oscillation elements of the rotary oscillation system can be mutually driven.

The object is achieved by the use of an elastic or resilient spring element common to and mounting both oscillation elements.

A rotary oscillation system of the above-named kind is composed of two oscillation elements arranged coaxially in spaced relation to one another with one at least partially surrounding the other. A membrane serves as a spring element for these oscillation elements with both of the oscillation elements, at one end, being fixed to the membrane.

The oscillation elements are driven via this membrane and the measurement of the oscillation amplitude also occurs via this membrane.

The oscillation elements oscillate opposite one another. They both have equally large masses, a common mass center and a common axis of rotation through which their rotation moments counterbalance each other.

The membrane is deflected by the countercurrent oscillation elements whereby oscillation nodes are created, i.e. points which do not move. These points are used in order to fix the membrane itself to the container, preferably via a screw-in part and a membrane fixture. As the membrane fixture engages at these points, the system is not damped and no oscillation energy flows away to the container.

In light of mechanical manufacturing tolerances it is possible that the fixing of the membrane does not occur exactly at the oscillation nodes. Thus, and to provide that no oscillation energy flows away, a neutralizing membrane can be attached between the membrane fixture and the container. The drive and detection of the oscillation occur preferably via piezo discs which are attached directly on the membrane on which both oscillation elements are fixed. This means, however, that in the case of a defect piezo a repair is impossible and the whole oscillation unit must be exchanged.

In order to avoid this, the drive and detection unit can be provided detachably whereby the connection between piezos and the membrane is obtained via a driver rod.

As soon as the outer oscillation body touches the filling material the oscillation is damped and this is then used for the registration of filling material.

Further details, advantages and features of the invention result from the preferred embodiments illustrated in the drawing.

DESCRIPTION OF PREFERRED EMBODIMENTS

Figure 1:
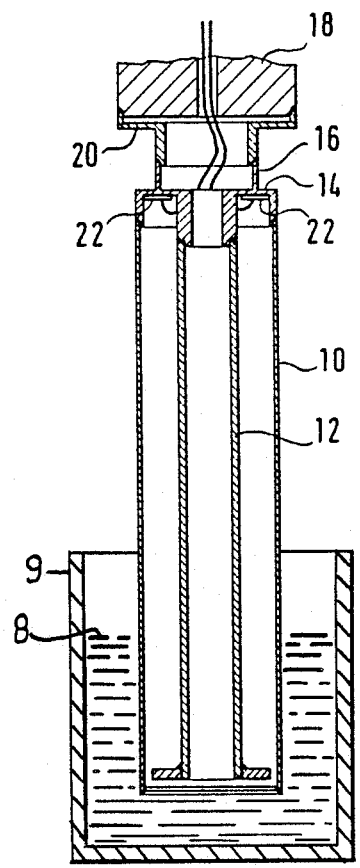
FIG. 1 shows a sectional side view of the rotation oscillation system.

In FIG. 1, an oscillation unit for a filling material vibration limit switch is shown in transverse section. The oscillation unit is for determining a certain filling level of a filling material 8 in a container 9. The oscillation unit is composed of two oscillation elements 10 and 12 which are arranged coaxially to one another with the outer element 10 at least partially surrounding the inner element 12 in outwardly spaced relation thereto. Both oscillation elements are formed in a cylindrical or pipe shape.

Both oscillation elements 10, 12 are connected at their respective upper free ends to the same or a mutual elastic or resilient ring membrane 14 which functions as a retraction spring.

Both oscillation elements 10, 12 oscillate oppositely and have equally large masses and a common mass center as well as a common axis of rotation so that the rotation moments counteract one another.

Figure 3A:
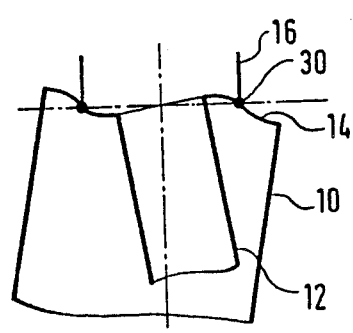
FIGS. 3a, 3b, 3c show the oscillation course of the mutual fixing membrane of the oscillating body.
Figure 3B:
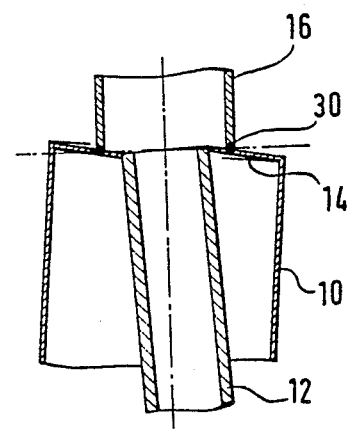

With the opposite oscillation of both oscillation elements 10, 12 an oscillation node 30 is created on the mutual membrane 14 between both oscillation elements. FIGS. 3a and 3b show that even with different deflection of the oscillation elements 10, 12 the oscillation node 30 always remains in the same place.

In the area of this oscillation node 30 a fixture ring 16 is attached to the opposite membrane side. This fixture ring 16 must align exactly above the oscillation node 30 so that engagement to a screw-in part 18 can occur without the system being damped and without oscillation energy being lost via the screw-in part 18.

Because of mechanical manufacturing tolerances it is possible that the fixture ring 16 will not be situated exactly above the oscillation node 30 and thus a small part of the oscillation energy can flow away. In order to prevent this a neutralizing membrane 20 can be attached, as shown in FIG. 1, between the fixture ring 16 and the screw-in part 18.

Drive and detection of the oscillation system according to FIG. 1 occur via two stuck-on piezo discs 22. In the case of a defective piezo a repair is not possible, the whole system must be exchanged.

Figure 2:
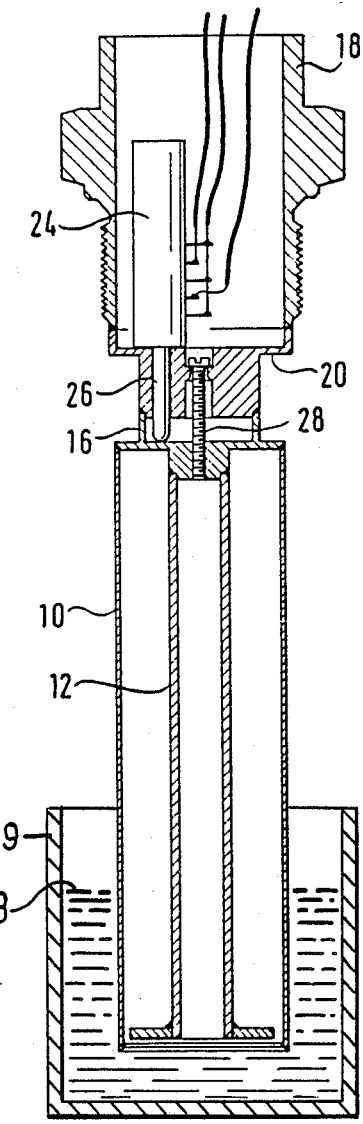
FIG. 2 shows a variant of the system illustrated in FIG. 1.

In FIG. 2 an oscillation system is illustrated with an exchangeable drive and detection unit. The screw-in part 18 contains a metallic member 24 in which the piezo stacks are accommodated. A driver rod 26 produces the connection between the ring membrane 14 and the piezo stacks stored in the member 24. In order to stress the ring membrane 14 as little as possible the driver rod 26 is placed as near to the fixture ring 16 as possible so that the driver rod 26 engages with short leverage near to the oscillation node 30.

In order to prevent a bending of the middle of the membrane in an axial direction a support screw 28 is elastically engaged in the center of the membrane 14.

Figure 3C:
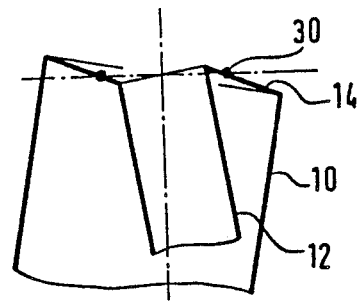

In FIGS. 3a, 3b and 3c the distortion of the ring membrane 14 is more closely illustrated with the deflection of the oscillation elements 10 and 12. In FIG. 3a the actual arch-shaped deflection of the ring membrane 14 is illustrated while in FIGS. 3b and 3c the distortion course of the ring membrane 14 is only illustrated as schematically angular. It becomes clear that even with different deflection of the oscillation elements 10 and 12 the oscillation node 30 always remains in the same place.

I claim:

1. Device for determining a certain filling level of a filling material in a container including an oscillation probe, said probe having two oscillation elements, an inner and outer oscillating element (10, 12), both which oscillate with a same resonance frequency and in opposite directions of rotation, said inner and outer oscillation elements being in coaxially spaced relation with said outer oscillation element (10) at least partially enveloping said inner oscillation element (12) whereby oscillations of the oscillation probe are damped with touching of the filling material with said outer oscillation element (10), and electromechanical transformers in the form of piezo-electrical means are provided to drive the oscillation probe and detect an oscillation amplitude; the improvement comprising a ring membrane (14) common to said outer oscillation element (10) and said inner oscillation element (12), said outer and inner oscillation elements being fixed to said common ring membrane (14) so oscillation of said inner and outer oscillation elements deflects said common ring membrane and defines an oscillation node therein, and a fixture ring on said common ring membrane (14) for connection, preferably via a screw-in part (18), with the container, said fixture ring engaging said common ring membrane at said oscillation node of said common ring membrane (14); and a neutralizing membrane connected to said fixture ring for elastically connecting the container and preventing flow of oscillation energy to the container.

2. Device according to claim 1, wherein said piezo-electrical means are detachably connected to said common ring membrane by a driver rod (26).

3. Device according to claim 2, wherein said driver rod (26) engages said common ring member (14) adjacent said oscillation node (30) for minimal stress of said common ring membrane.

4. Device according to claim 2, including a support screw (28) elastically engaged in the middle of said common ring membrane (14) to prevent bending of said common ring membrane in an axial direction.

5. Device according to claim 4, wherein said driver rod (26) engages said ring member (14) adjacent said oscillation node (30) for minimal stress of said common ring membrane.

6. Device for determining a certain filling level of a filling material in a container including an oscillation probe, said probe having two oscillation elements, an inner and outer oscillating element (10, 12), both which oscillate with a same resonance frequency and in opposite directions of rotation, said inner and outer oscillation elements being in coaxially spaced relation with said outer oscillation element (10) at least partially enveloping said inner oscillation element (12) whereby oscillations of the oscillation probe are damped with touching of the filling material with said outer oscillation element (10), and electromechanical transformers in the form of piezo-electrical means are provided to drive the oscillation probe and detect an oscillation amplitude; the improvement comprising a ring membrane (14) common to said outer oscillation element (10) and said inner oscillation element (12), said outer and inner oscillation elements being fixed to said common ring membrane (14) so oscillation of said inner and outer oscillation elements deflects said common ring membrane and defines an oscillation node therein, and a fixture ring on said common ring membrane (14) for connection, preferably via a screw-in part (18), with the container, said fixture ring engaging said common ring membrane at said oscillation node of said common ring membrane (14); and said piezo-electric means are detachably connected to said common ring membrane by a driver rod (26).

7. Device according to claim 6, wherein said driver rod (26) engages said common ring membrane (14) adjacent said oscillation node (30) for minimal stress of said common ring membrane.

* * * * *